US012697574B2

(12) United States Patent
Cordoni

(10) Patent No.: US 12,697,574 B2
(45) Date of Patent: Aug. 4, 2026

(54) AIR FILTRATION SYSTEM AND SET OF PROFILES AND ACCESSORIES FOR SEALING AND CREATION OF A SEALED OR PARTIALLY SEALED ENVIRONMENT WITH CONTROLLED AIRFLOW

(71) Applicant: Cristiano Cordoni, São Paulo (BR)

(72) Inventor: Cristiano Cordoni, São Paulo (BR)

( * ) Notice: Subject to any disclaimer, the term of this patent is extended or adjusted under 35 U.S.C. 154(b) by 418 days.

(21) Appl. No.: 18/390,204

(22) Filed: Dec. 20, 2023

(65) Prior Publication Data

US 2025/0205628 A1 Jun. 26, 2025

(51) Int. Cl.
| | |
|---|---|
| B01D 46/54 | (2006.01) |
| A47K 3/28 | (2006.01) |
| B01D 46/62 | (2022.01) |
| B01D 71/70 | (2006.01) |
| *E06B 3/54* | (2006.01) |
| *E06B 7/16* | (2006.01) |

(52) U.S. Cl.
CPC .............. B01D 46/543 (2013.01); A47K 3/28 (2013.01); B01D 46/62 (2022.01); B01D 71/70 (2013.01); *E06B 3/54* (2013.01); *E06B 7/16* (2013.01)

(58) Field of Classification Search
CPC ...... B01D 46/543; B01D 46/62; B01D 71/70; E06B 3/54; E06B 7/16; E06B 3/4636; E06B 3/922; E04B 2/827; E05D 15/08; E05F 11/54; E05Y 2900/132; E05Y 2900/142
See application file for complete search history.

(56) References Cited

U.S. PATENT DOCUMENTS

| | | | | |
|---|---|---|---|---|
| 5,647,074 | A * | 7/1997 | White, Jr. ............... | E03D 9/002 |
| | | | | 4/312 |
| 8,747,506 | B2 * | 6/2014 | Borkent ............... | B01D 46/521 |
| | | | | 55/497 |
| 2019/0169899 | A1 * | 6/2019 | Miksza ................... | E06B 3/922 |
| 2021/0230892 | A1 * | 7/2021 | Urpolahti ............ | E05D 15/0652 |
| 2023/0167670 | A1 * | 6/2023 | Joossen ................. | E06B 3/4609 |
| | | | | 49/425 |
| 2026/0084099 | A1 * | 3/2026 | Nakashima .......... | B01D 53/228 |

FOREIGN PATENT DOCUMENTS

| | | | | | |
|---|---|---|---|---|---|
| BR | 20 2014 024466 8 | | 9/2016 | | |
| BR | 202014024466 | U2 * | 9/2016 | ............... | A47K 3/30 |
| BR | 202014024466 | Y1 * | 1/2020 | ............... | E06B 7/28 |
| BR | 10 2019 021658 1 | | 4/2020 | | |
| BR | 20 2020 004975 0 | | 3/2021 | | |

(Continued)

*Primary Examiner* — Stephen Hobson
(74) *Attorney, Agent, or Firm* — B. Aaron Schulman, Esq.; Stites & Harbison, PLLC

(57) ABSTRACT

An air filtration system and set of profiles and accessories for creating a sealed or partially sealed (PS) environment, such as a shower stall, sauna, wine cellar, medical office, toilet installation area, "gourmet" areas, and the like; the air filtration system comprising a set of filters, each with a central silicone membrane and bristles made of plastic compounds, installed in respective supports, which in turn are installed in the profiles of the set, especially in rails of the lower bed profile with air inflow and in a coplanar manner and between the protrusions of the upper profile and in a rail provided in the profile for receiving the sliding glass panel with air outflow without steam.

15 Claims, 9 Drawing Sheets

(56)                    References Cited

FOREIGN PATENT DOCUMENTS

| CN | 213551441 | | | 6/2021 | | |
|----|-----------|---|---|--------|---|---|
| CN | 213551441 | U | * | 6/2021 | | |
| CN | 117266716 | A | * | 12/2023 | ........... | E06B 3/4609 |
| CN | 117588085 | A | * | 2/2024 | ........... | E04H 1/1266 |
| CN | 120838760 | A | * | 10/2025 | ........... | F26B 21/001 |
| DE | 102017120326 | A1 | * | 3/2019 | ........ | E05D 15/0652 |
| EP | 1700992 | A1 | * | 9/2006 | .............. | E06B 3/64 |
| EP | 2141314 | A1 | * | 1/2010 | ........ | E05D 15/0686 |
| FR | 2562409 | A1 | * | 10/1985 | .............. | A47K 3/28 |
| FR | 2845116 | A1 | * | 4/2004 | ........... | E06B 3/677 |
| FR | 2926105 | A1 | * | 7/2009 | ........ | E05D 15/0686 |
| WO | WO-2021072516 | A1 | * | 4/2021 | ........... | E06B 3/4636 |
| WO | WO-2021087585 | A1 | * | 5/2021 | ........... | E06B 3/4636 |
| WO | WO-2021184091 | A1 | * | 9/2021 | ............. | E05F 11/54 |
| WO | WO-2025264115 | A1 | * | 12/2025 | ............. | C02F 1/447 |

* cited by examiner

AIR FILTRATION SYSTEM AND SET OF PROFILES AND ACCESSORIES FOR SEALING AND CREATION OF A SEALED OR PARTIALLY SEALED ENVIRONMENT WITH CONTROLLED AIRFLOW

FIELD OF THE INVENTION

This invention seeks to provide an air filtration system and set of profiles and accessories for sealing and creation of a sealed or partially sealed environment with controlled airflow, such as a bathroom shower stall, sauna, wine cellar, medical offices, toilet installation area, "gourmet" areas, and others that require sealing, controlled airflow, thermal efficiency, and/or acoustic efficiency.

The filtration system of the present invention is designed to retain steam in the sealed or partially sealed environment and comprises a set of filters, mounted on respective support profiles, in turn installed on the set of innovative profiles and accessories, each filter being provided with a silicone membrane. For the air inflow, a pair of filters is provided, installed next to the lower bed profile, and three, two, or one filter installed in the upper bed profile, whose decrease or increase in pressure on them makes up the increase or decrease in flow rate for the air outflow without steam/heat.

BACKGROUND OF THE INVENTION

It is known that conventional shower stalls are typically composed of a set of metal profiles and accessories attached to the floor and side walls. These profiles support fixed and/or sliding panels of tempered glass, plastic or acrylic sheets, or flexible screens. These panels or screens form a barrier that separates bathing area referred to as the "wet" area, from the external area, referred to as the "dry" area, where the toilet, sink, furniture, mirrors, etc. are usually located. The barrier prevents shower water from splashing onto the dry area, thus avoiding the need to wipe it up after each shower.

A secondary function of a conventional shower stall is related to aesthetics and/or visual separation of environments to configure a private bathing environment.

However, said conventional shower stalls do not present functions related to the containment of steam, heat, and noise, since the installation of the panels conventionally configures an upper opening for the escape of steam and/or gaps between the glass panels and mainly between the glass and metal profiles. Additionally, they do not guarantee the total safety of the user, since the worldwide standard for shower stalls is the use of tempered glass or plastic that is subject to breakage/shattering, promoting the risk of injury to users.

Therefore, the inability to retain steam within the conventional shower stall allows the steam from hot water to spread and condense on the surfaces of the dry external areas of the bathroom and adjacent rooms, such as walk-in closets, bedrooms, and others, leaving them damp every time you take a shower and, consequently, damaging cabinets, mirrors, and others.

Among the main undesirable consequences of this humidity are the entry of cold air into the shower stall, causing thermal discomfort (cold) during and after the shower, the oxidation of mirrors and metals, cracks in the ceiling, peeling paint on the ceiling and walls, wet or damp floor, towels, and toilet paper, swelling of doors and other woods, the formation of mold, mildew, and bad odor on the ceiling of the bathroom and adjacent areas and on the clothes in the closets, in addition to the proliferation of microorganisms, the risk of the user slipping on the wet floor of the external area, excessive sweating when drying off in a humid and hot bathroom due to the steam, the detachment of the "formica" from the furniture, the deterioration of makeup products and hygiene and beauty equipment stored in the bathroom that are not water resistant, due to constant humidity, among others.

The applicant, who is active in the field and a researcher on the topic, is the holder of document number BR 202014024466-8, referring to a shower stall, belonging to the field of installations used in bathrooms and similar areas. The stall is a sealed stall with a height equal to the ceiling height of the bathroom and a sealing system consisting of seals between the sealed stall and the ceiling, wall(s), and floor of the bathroom, as well as seals between parts and interstices of the parts of the sealed stall.

Despite the document revealing a sealing system for the creation of a sealed shower stall, it is a fact that after studies and tests, there are some drawbacks, such as the prevention of gas exchange, which posed a risk to the health and life of users, as could cause suffocation due to $CO_2$ accumulation inside the shower stall, especially in the case of a user using it as a sauna and falling asleep or fainting. Therefore, its use is dangerous.

Another drawback verified in studies and installations is the fact that the system revealed in document no. BR 202014024466-8 creates a completely sealed environment, generating pressure, positive or negative, such as when the window is open and exposed to winds or even when the steam pressure from the sauna increases in the internal pressure of the shower stall, such that the sliding door becomes exceptionally difficult to open until the pressure is overcome and the seals release the pressure. To open it, it is necessary to apply a great deal of force to overcome the pressure, making it inconvenient for children and elderly.

For these reasons, the applicant, with the intention of evolving in the creation of sealed or partially sealed environments safe for users, developed an air filtration system capable of preventing the escape of steam and heat, with a limited and continuous airflow, in a safe cycle that, associated with the set of profiles and accessories, guarantees safe and effective use.

In a survey conducted in specialized databases, documents were found regarding airflow systems and sets of profiles and accessories for the composition of environments such as shower stalls, such as, presented in document no. BR 20.2020.004975-0 referring to a set of supports for the upper part of the bathroom stall frame and lateral finishing profiles for laminated glass, in a opening and closing sliding system, after fixing the lower guide to the floor of the stall, a lateral support is screwed to a point above on the wall delimiting the stall to receive, through the hole in its body, a beater with a cylindrical body and a larger diameter and rounded head. The support exposes a channel with angular walls in a pincer configuration also with a hole, for screwing. After the "U" profiles are placed on the side edges of the fixed and movable glass, the fixed glass is inserted into the lower guide and the side support channel, and it is aligned parallel to the movable glass with the aid of an alignment template. The movable glass is then inserted into the sliding system of the lower guide. Being leveled by their upper edges, they receive two supports, each with a channel through which, alternately, they are locked on the fixed glass and positioned to guide the movable glass in its sliding, in a stabilized way with the aid of adjusters.

Document No. BR. 10.2019.021658-1 presents a door made of laminated glass panels, with a sliding panel assembly for an opening and closing system. Two fixed guides, one external to the shower stall and one internal, are coupled together through a mobile base that holds a mobile profile for accommodating the movable glass panel. When the user opens and closes the panels, using a pull handle, the movable glass panel slides smoothly with its mobile base sliding along the internal fixed guide to open and close the shower stall. The installation, assembly, and operation of the system in the shower stall, including the laminated glass panels, are done entirely without drilling or screws.

Document No. CN213551441 reveals a shower room with sauna function, which comprises a shower room and a sauna room, that are separated by a partition plate, the shower room comprises a top plate, the top of the top plate is provided with a fan, the outlet end of the fan extends to the bathroom and the outlet end of the fan is provided with a Positive Temperature Coefficient heating module. By adopting the structure, ventilation and hot air ventilation can be carried out in the bathroom.

Therefore, it is a fact that the documents mentioned in the paragraphs above, despite belonging to the same field of application, do not present any of the characteristics of the object now improved, thus ensuring that it meets the legal requirements for patentability.

SUMMARY OF THE INVENTION

It is, therefore, the objective of this invention to present an air filtration system and set of profiles and accessories for sealing and creation of a sealed or partially sealed environment with controlled air flow. This air sealing and filtration system is comprised of a set of filters mounted on respective support profiles, which are in turn installed on the set of profiles and accessories. Each filter is provided with a silicone membrane that, under pressure, forms a seal for the air flow. For the air intake flow, a pair of filters are provided, installed next to the lower bed profile, and three, two, or one filter is installed on the upper bed profile, depending on the environment to be created, and the decrease or increase in pressure on the filters corresponds to the increase or decrease in the flow rate for the air outlet flow, creating the sealed or partially sealed environment.

It is also the objective of this invention to present an air filtration system and set of profiles and accessories that configure a system of multiple barriers and filters that allows for controlled air exchange between dry and wet areas, retaining steam and heat, preventing them from heating and wetting the external areas. This solution even allows for the installation of a sauna, without the steam escaping and contaminating the external environment.

Another objective of this invention is to present an air filtration system and set of profiles and accessories that allows for air exchange between the internal and external areas of the shower stall, preventing the user from falling asleep/fainting/choking due to $CO_2$ accumulation. Therefore, it is a safety technology for any sealing system that can be applied to prevent the escape of steam and entry of cold air into a sealed or partially sealed environment.

It is also the objective of this invention to present an air filtration system and set of profiles and accessories that are custom-made for each environment, for from floor to ceiling closing, whose profile features allow the use of special, safety-laminated glass, ½ inch thick. This glass is made up of two ¼ inch glass plates, joined by a polyvinyl butyral (PVB) film, so in the event of breakage, the glass shards do not detach or shatter, ensuring the safety of users, adults or children, from accidental injuries.

Another advantage is the use of ½ inch thick laminated glass, which provides a much more efficient barrier against heat and sound exchange than tempered glass in conventional shower stalls. This is because the PVB (polyvinyl butyral) used as the central film is a thermal and acoustic insulation material, and the large thickness of the glass greatly contributes to this increase in efficiency.

Another objective of this invention is to present an air filtration system and set of profiles and accessories that are custom-installed using fine-measurement processes and procedures to verify the cubage, heat emission, and other parameters that require specific training for installers.

Another objective of this invention is to present an air filtration system and set of profiles and accessories that allows for the installation of a closed-off toilet area, providing privacy and comfort by preventing the escape of unpleasant odors and noises associated with toilet use. This is especially desirable in shared bathrooms, where one person can use the toilet while another uses the shower area, brushes their teeth, or uses the sink or mirror, without the odors and noises from the toilet use bothering them. For this type of installation, it is necessary to use a fully sealed system, as the filters are not capable of eliminating unpleasant odors when the air passes through them.

Another objective of this invention is to present an air filtration system and set of profiles and accessories that allows for installation around bathtubs, hot tubs, and pools, retaining the internal temperature and maximizing the thermal comfort of users without the risk of glass shards or steam escaping.

It is also an objective of this invention to present an air filtration system and set of profiles and accessories that allows for installation as an acoustic insulator, and can be used in doctor's offices, classrooms, libraries, and in any type of situation where it is desirable to inhibit noise and it is not feasible to use acoustic glass (blown). In these acoustic installations, where there is air exchange through other means, the fully sealed version is used, as its acoustic efficiency is even greater than the version that allows air exchange.

Another objective of this invention is to present an air filtration system and set of profiles and accessories that allows for installation as a wine cellar, greenhouse, or other application that requires thermal efficiency, as it has excellent visual presentation and high thermal insulation efficiency.

It is also an objective of this invention to present a set of profiles and accessories with a clean and differentiated aesthetic presentation, as the upper rails are rectangular and are always installed along the ceiling, remaining peripheral to the user's field of vision, making the ambiance much more 'clean' and pleasant. In addition to the use of minimalist finishes and a bonding system that allows the silicone adhesive to be hidden in the rail, preventing mold formation in the adhesive, significantly differentiating it from conventional shower stalls/systems.

Thus, the use of the air filtration system and set of profiles and accessories provides a number of advantages, such as: (i) Creation of a heated bathing area with thermal comfort for the user, resulting in great energy savings, since the heated water can be up to 12° C. cooler than when using conventional shower stalls. (ii) improved hydration and appearance of the skin and hair through the use of warm water with a higher concentration of steam instead of hot water. (iii) Great water and energy for heating savings up to 60%, since the thermal comfort makes it possible to turn off the shower without the user feeling cold. (iv) external environment looking new for a longer time due to the absence of steam/humidity/heat, resulting in savings on maintenance and renovations. (v) absence of fogging of the mirror and, consequently, time saving by using the mirror while another person is using the bathing area. (vi) mirror and the entire external area of the bathroom completely dry and clean, eliminating the need for towel drying, and subsequently the need to clean the water stains from the condensed steam on the mirror/glass/metals. (vii) thermal comfort for the user to dry himself inside the shower stall without feeling cold, avoiding thermal shocks and minimizing the risk of colds and flu. (viii) allow drying yourself outside the shower on hot days, without the post-bath sweat that is caused mainly by the humidity and heat of the bath in the form of steam that heats and humidifies the entire external area, in a conventional shower stall. (ix) in installations with a window inside the shower stall, it allows the internal area to dry, isolating the rest of the bathroom from wind, dust, soot, and noise from the external areas of the residence.

DETAILED DESCRIPTION OF THE INVENTION

The present patent application relates to an air filtration system and set of profiles and accessories for sealing and creation of a sealed or partially sealed environment with controlled airflow, having a filtration and sealing system (100) and set of profiles and accessories (200) for creating a sealed (AS) or partially sealed (PS) environment, such as a shower stall, sauna, wine cellar, medical offices, toilet installation area, "gourmet" areas, and the like.

In the present invention, the filtration system (100) is designed to eliminate steam/heat (VC) from the wet internal area (AU) of a sealed (AS) or partially sealed (PS) environment with air inflow (F1) and air outflow (F2) to the dry external area (AE), the filtration system (100) comprising two filter sets (110), one of which is mounted on the lower

Figure 1:
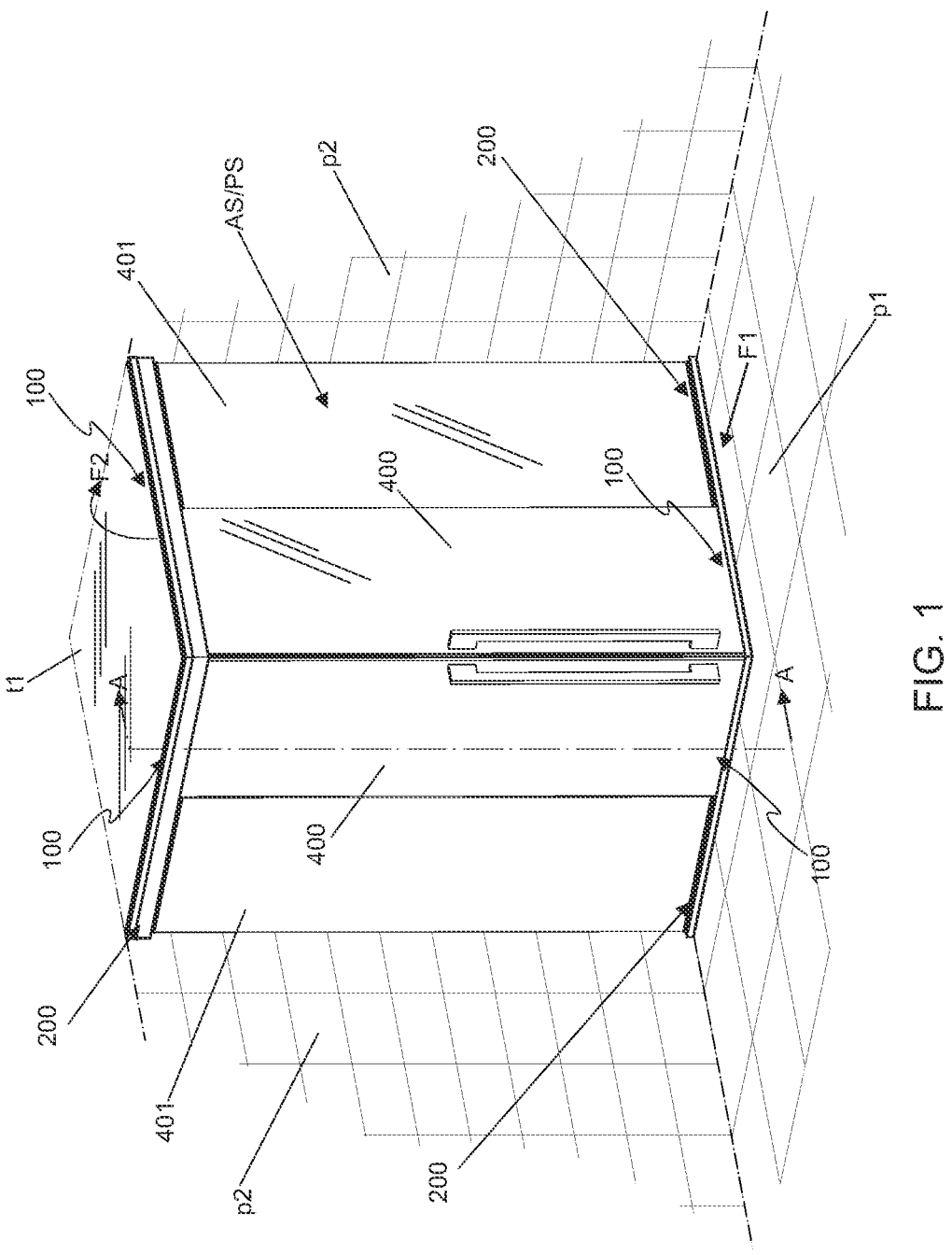
FIG. 1 represents a perspective view of a sealed or partially sealed environment in the form of a shower stall where the air filtration system and set of profiles and accessories in question are installed.
Figure 2:
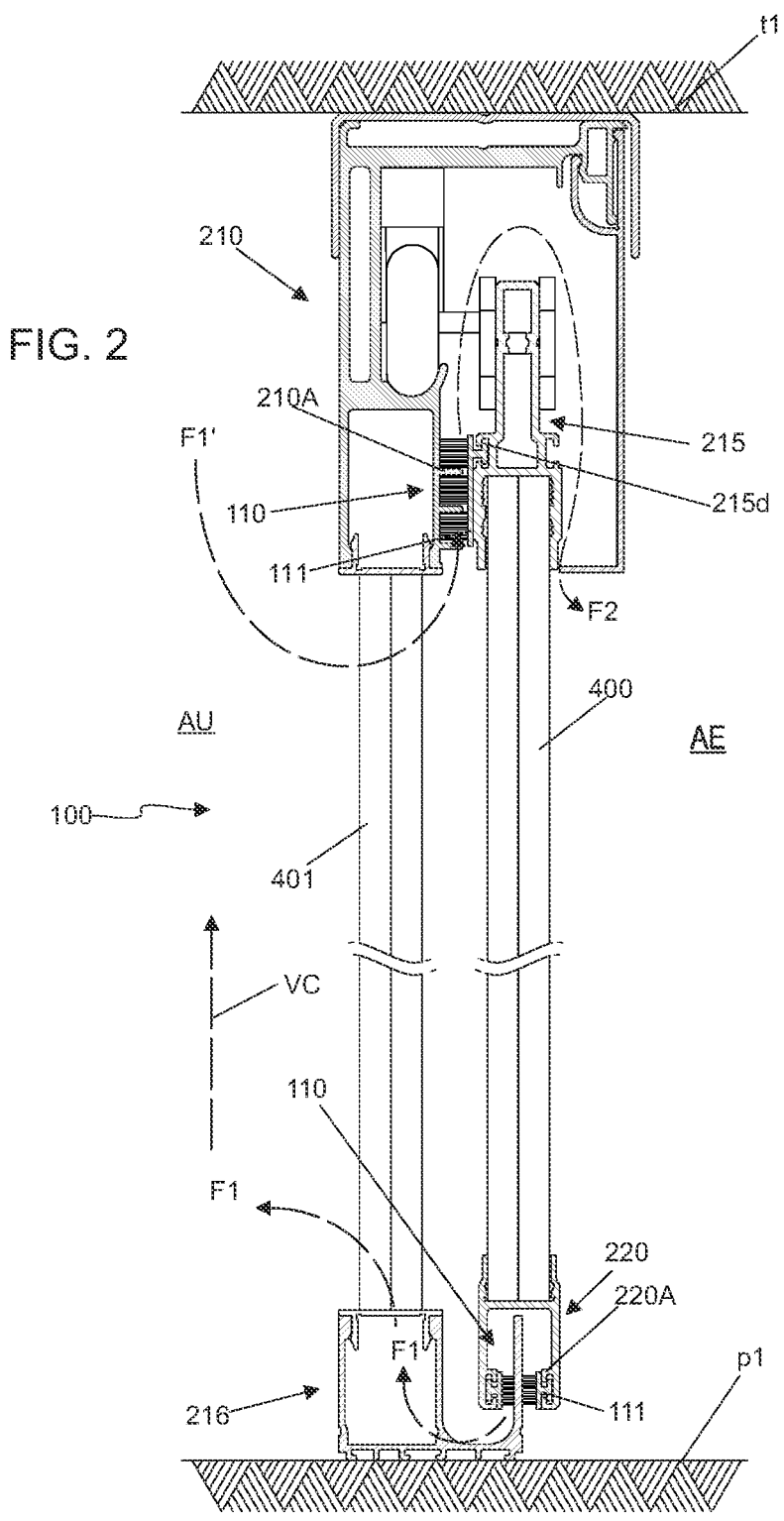
FIG. 2 shows a longitudinal section A.A illustrating the components of the air filtration system and airflow.
Figure 3:
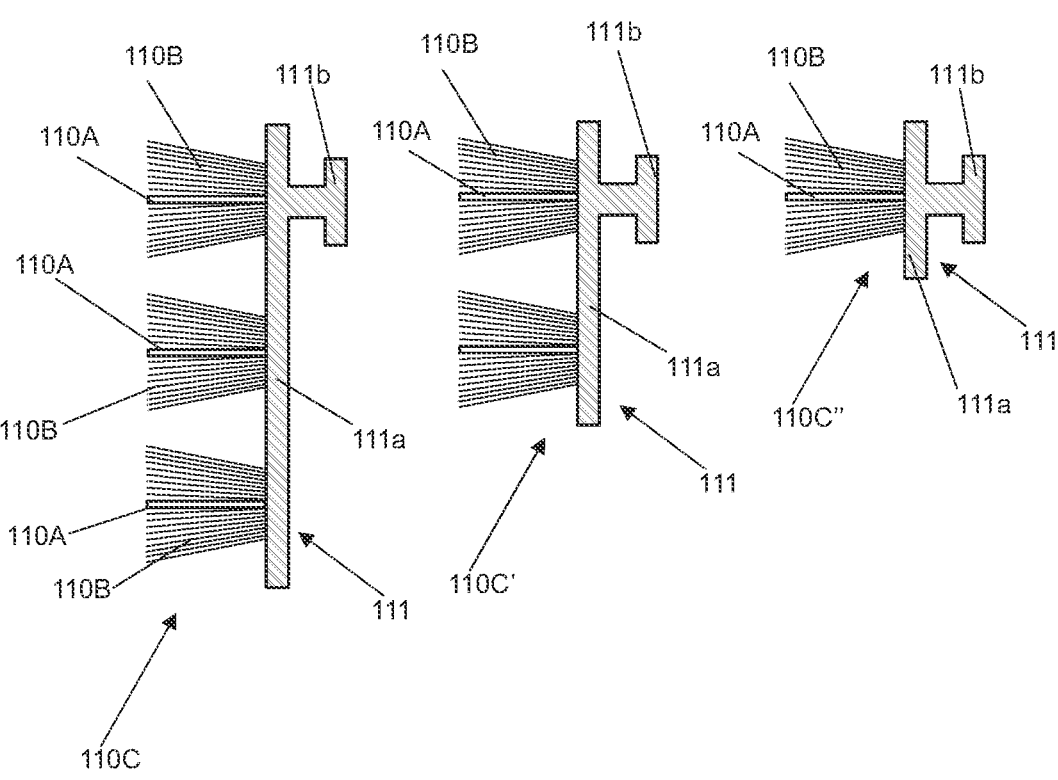
FIG. 3 shows the set of filters and their respective variations.
Figures 4A, 4B, 4C:
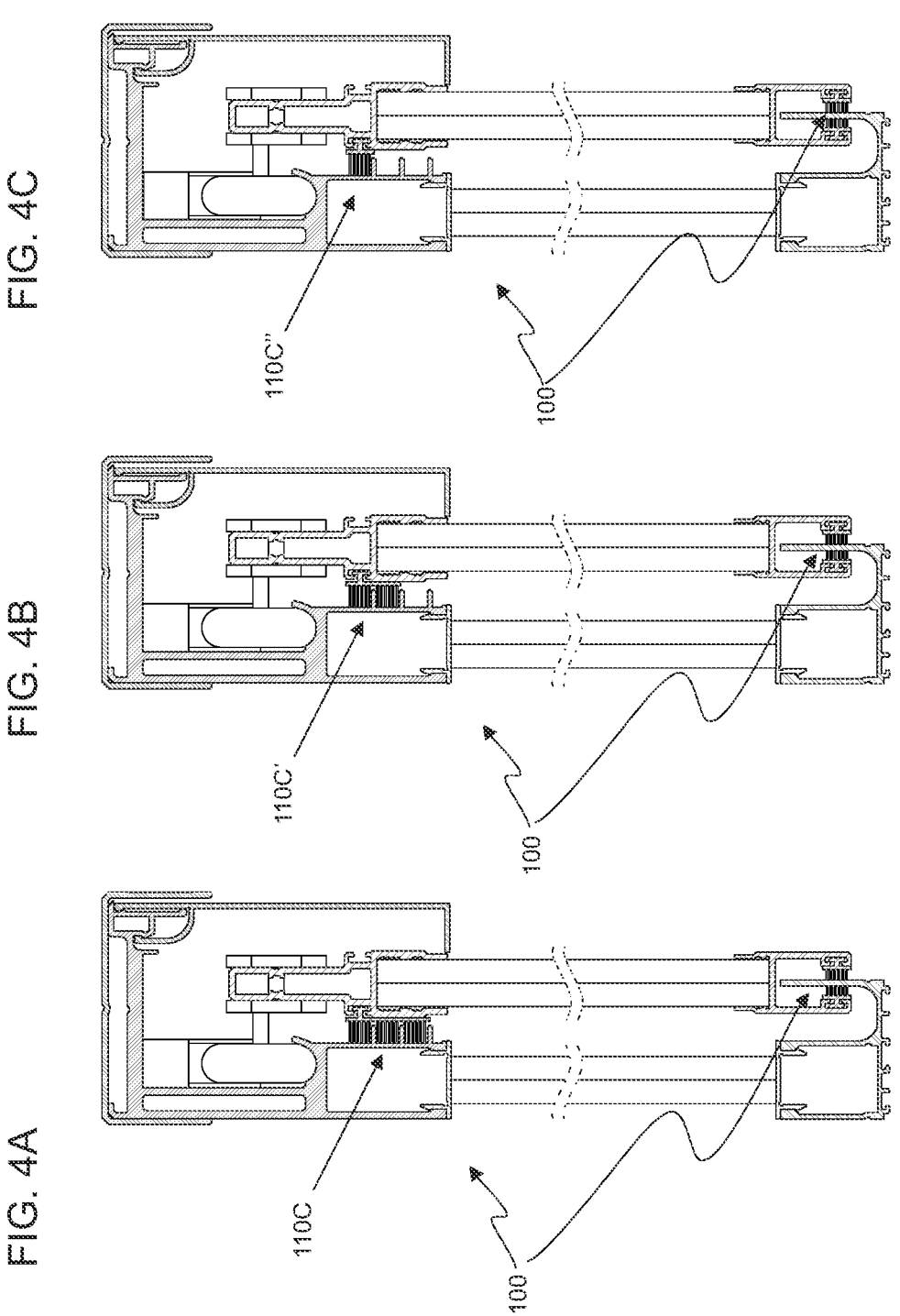
FIGS. 4A, 4B, and 4C represent longitudinal sections A.A indicated in FIG. 1, illustrating the assembly of the filter variations next to the profiles that compose the set in question.
Figure 5:
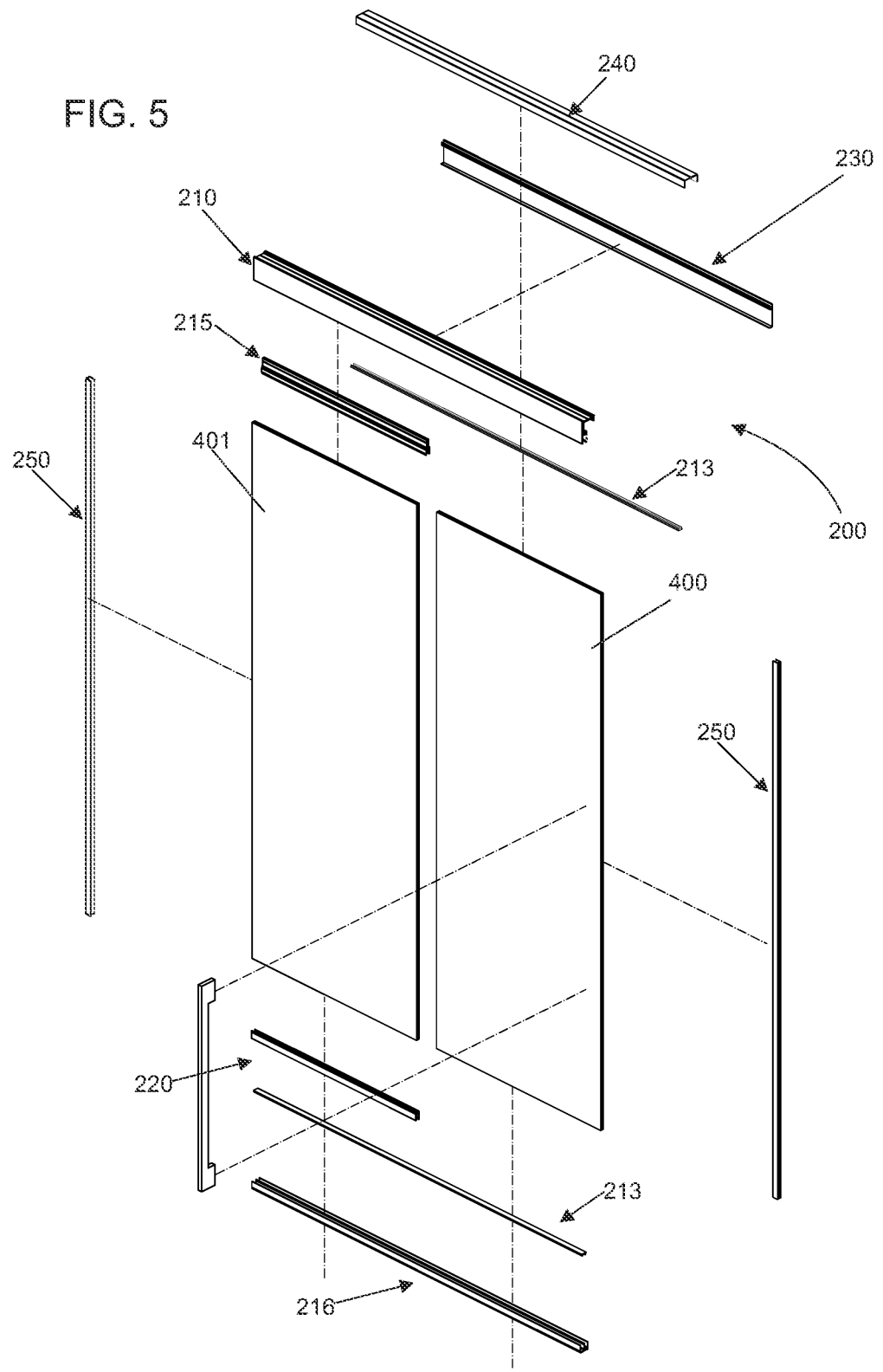
FIG. 5 shows a perspective view of the main profiles that compose the set and accessories.
Figure 6:
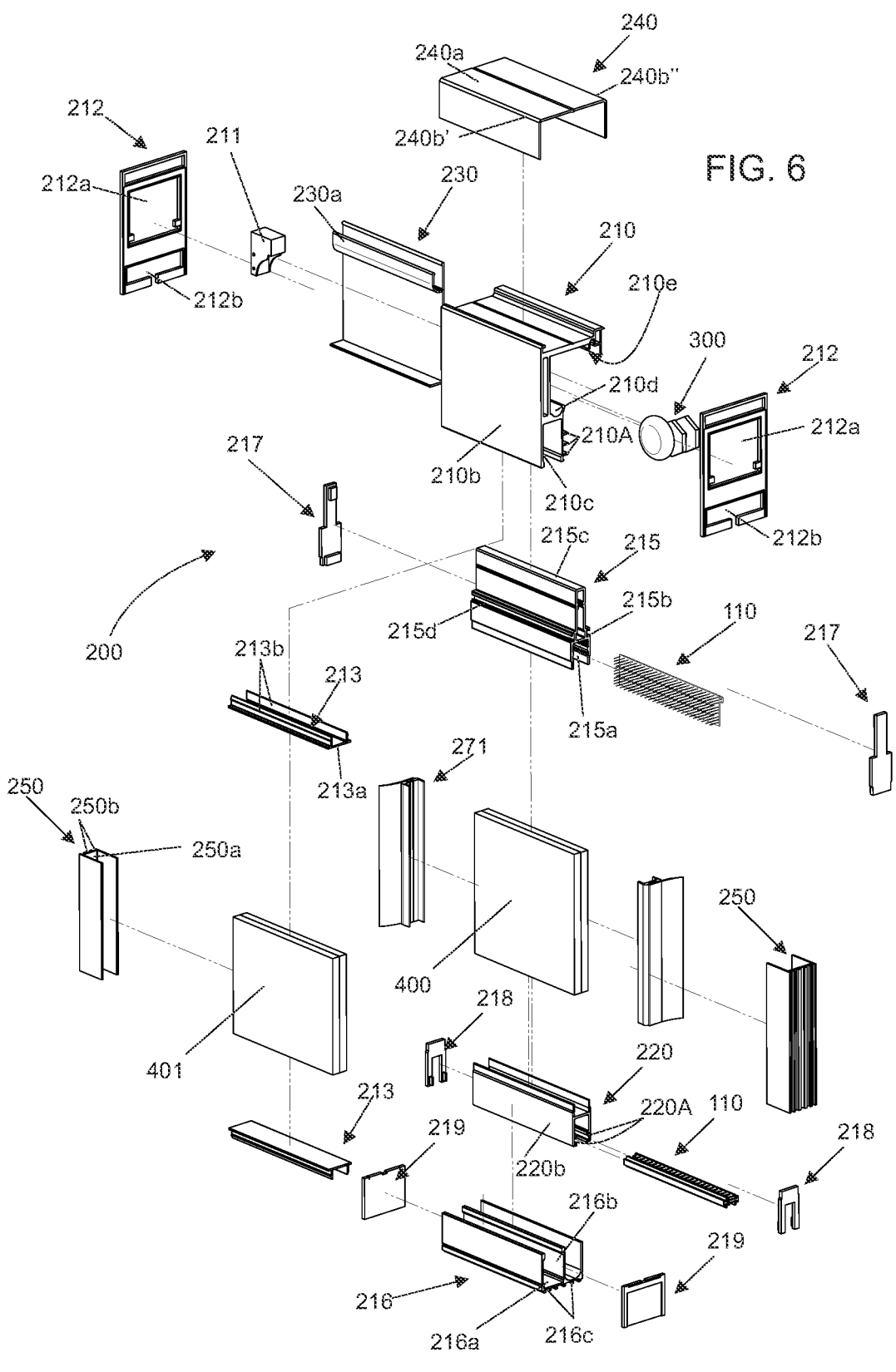
FIG. 6 represents an enlarged perspective view of the profiles that compose the set and accessories.
Figure 7:
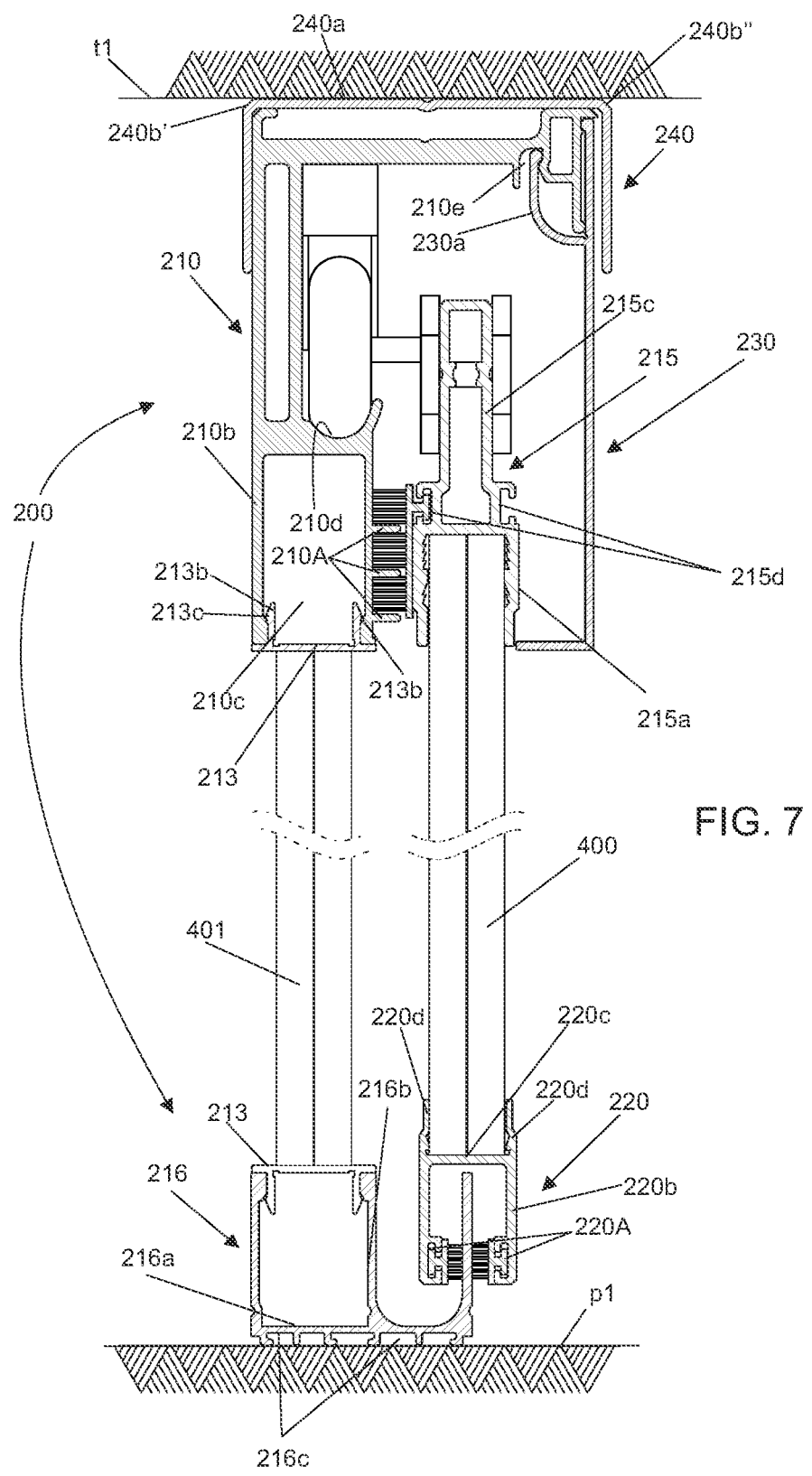
FIG. 7 represents a longitudinal section illustrating the assembly between the profiles that compose the set.
Figure 8:
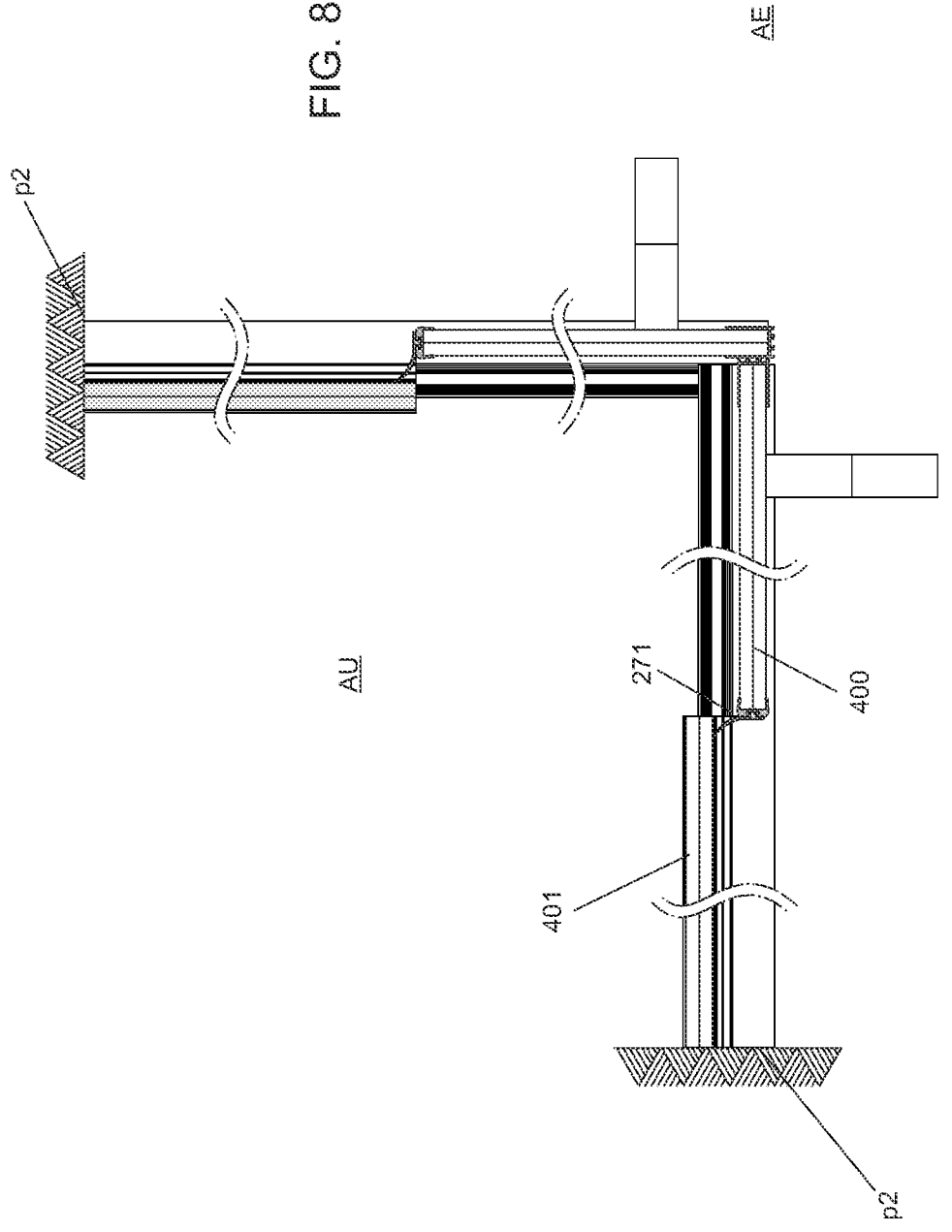
FIG. 8 reveals a cross-sectional view illustrating the assembly of the seal between the sliding and fixed glass panels.
Figures 9A, 9B, 9C:
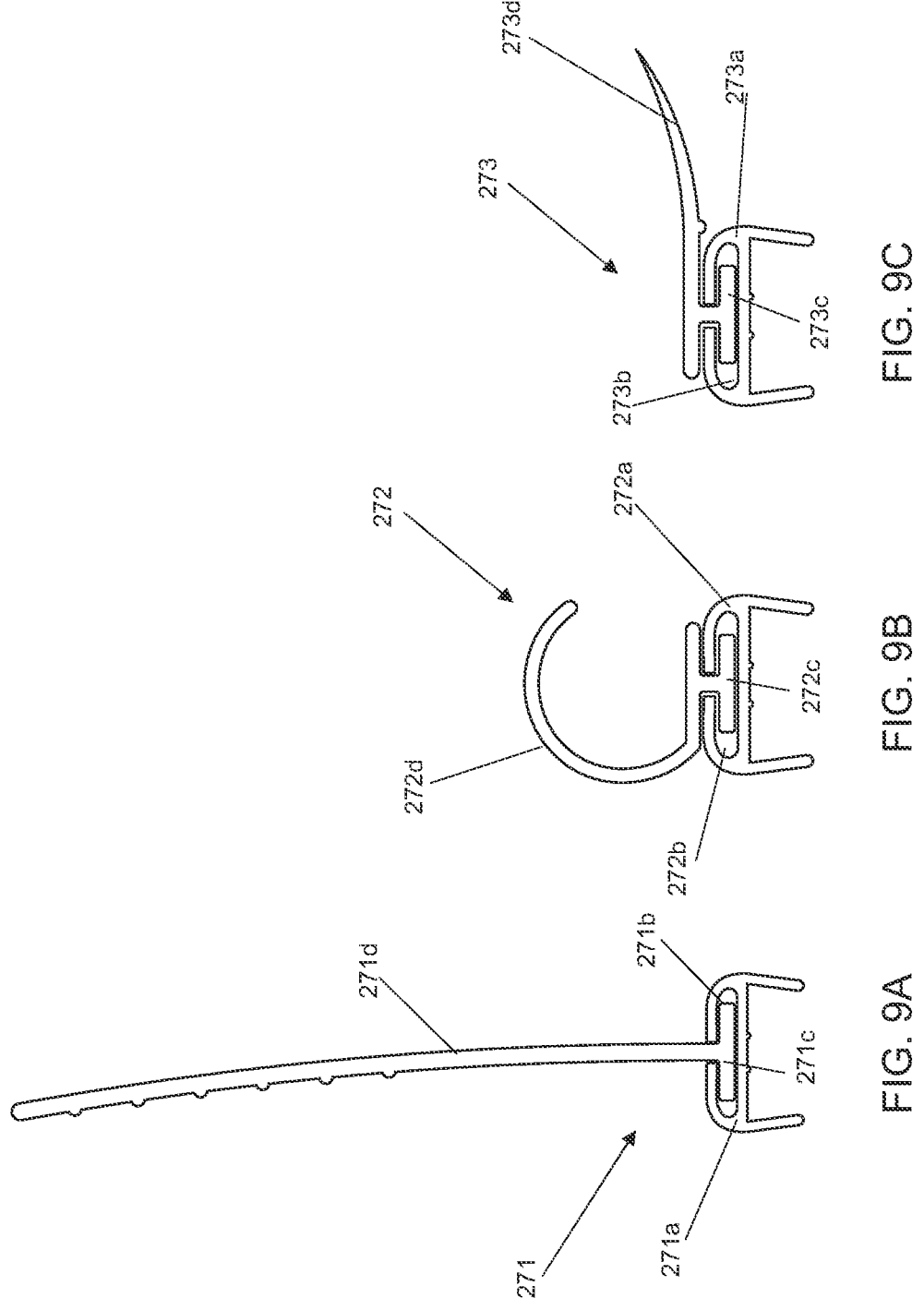
FIGS. 9A, 9B, and 9C reveal frontal views of the variations of the seals between the sliding and fixed glass panels and aluminum profiles.

6 bed profile (220) and another set mounted on the upper bed profile (215) (FIG. 2 and FIG. 5); each filter set (110) includes one or more filters, each of which is provided with a central silicone membrane (110A) and bristles (110B) made of engineering plastic. Each filter set (110) is mounted on respective supports (111), which are in turn installed on rails (220A) of the lower bed profile (220) for the air inflow (F1), as well as mounted in a coplanar manner and between protrusions (210A) of the upper bed profile (210) and on rail (215d) provided in the upper bed profile (215) for receiving the sliding glass panel (400) for the air outflow (F2) without steam (see FIGS. 2 and 3).

The installation of the filtration system (100) along with the profiles (220) and (215), which are part of the set and accessories (200), configures the air flow cycle (F1)/(F2) (see FIG. 2) that is comprised of the air inflow (F1) through the filters (110) of the lower bed profile (220), the heating of this air (F1') by the steam/heat (VC) in the sealed (AS) or partially sealed (PS) environment, and the passage of this air (F1') through the filters (110) installed in the upper bed profile (215). The steam/heat (VC) condenses on the bristles (110B), leaving them wet. Consequently, the flow of steam (F1') through the wet bristles (110B) cools the air, condensing the steam (VC) and transforming it into water. This water, in turn, cools down and further moistens the bristles (110B), increasing the condensation and filtration of the steam (VC) so that the dry external area (AE) does not receive the steam/heat (VC) at the air outflow (F2).

The filter set (110) mounted in a coplanar manner and between protrusions (210A) of the upper bed profile (210) for the air outflow (F2) without steam (VC) (see FIG. 3) can be of the following types: Triple (110C): configured with three filters (110) installed on a single support (111), allowing for a constant flow of gas exchange; Double (110C'): configured with two filters (110) installed on a single support (111); Individual (110C"): configured with a single filter (110) installed on a support (111), that is comprised of a rectangular profile (111a) whose free end is provided with a rotated T-shaped projection (111b) for mounting on rails (220A) or (215d).

In a preferred version, the set of profiles and accessories (200) is installed between the floor (p1) and ceiling (t1) of the area, and it is comprised of an upper profile (210) made of special aerospace aluminum alloy with high resistance to deformation, in a rotated 'L' shape, configuring an orthogonal wall (210b) provided with a rotated U-shaped end whose upper wall has an arched recess (210d) configuring a channel for the sliding of rollers (300) made of nylon and stainless steel. The edge of the upper wall of the same upper profile (210) provides an inverted T-shaped branch with a longitudinal recess (210e) for mounting the longitudinal appendix (230a) provided in the cover (230) made of aluminum, concealing all the moving components. One of the walls of the U-shaped end (210c) has multiple protrusions (210A) on the outer face for receiving the filter set (110).

The upper wall of the upper profile (210) receives a U-shaped ceiling profile (240) with a rotated U-shaped made of a special "softer" aluminum alloy and installed telescopically in relation to the upper profile (210) to compensate for unevenness and irregularities of the ceiling (t1), minimizing the amount of adhesive used in the seal. The ceiling profile (240) has chamfers (240b')/(240b") on the edges of the upper wall (240a) to accommodate the silicone adhesive and make it invisible, providing an exclusive finishing free of visible silicone adhesive, mold, and mildew.

In the channel (210d) for the sliding of the roller (300), a door brake (211) is installed to limit the sliding of the glass panel (400). The extreme portions of the upper profile (210) receive a upper template (212) for sealing, protecting, and finishing the ends of the upper profile (210) and the cover profile (230) against the wall (p2). The template (212) is configured by a rectangular frame with a cutout (212a) positioned near the central region and a lower cutout (212b) on the lower edge.

The rotated U-shaped end (210c) of the upper profile (210) receives a finishing profile (213) made of aluminum and formed by a longitudinal plate (213a). where one of the flat faces, orthogonal walls (213b) develop with edges provided with tines (213c) for locking in the upper profile (210) and the lower bed profile (220), configuring a finishing in the opening for mounting the fixed glass panel (401).

Each sliding glass panel (400) or fixed panel (401) is made of 12 mm (½ inch) laminated glass. The sliding glass panel (400) is installed in the upper bed profile (215) mounted with the upper profile (210), and in the lower bed profile (220) sliding in the lower profile (216). The fixed glass panel (401) is fixed in the upper profile (210) and lower profile (216) with the finishing profiles (213).

The side edge of the fixed glass panel (401) receives a side finishing profile (250), also made of aluminum, for finishing and sealing against the wall (p2). The base (250a) of the profile (250) has grooves (250b) to accommodate the silicone adhesive and make it invisible, providing an exclusive finishing free of mold and mildew.

Between the glass panels (400) and (401), a sealing profile (270) is installed, made of PVC and silicone, which seals the exit of water and steam. The sealing profile can have various formats, such as: T-shaped sealing (271) (see FIGS. 8 and 9A, 9B, and 9C), which is comprised of a U-shaped base (271a) with a T-shaped cutout (271b) for coupling to a corresponding member (271c), from which an elongated flexible flap (271d) develops; Bumper sealing (272), which is formed by a U-shaped base (272a) with a T-shaped cutout (272b) for coupling to a corresponding member (272c), from which a semicircular projection (272d) develops; Squeegee sealing (273), which is comprised of a U-shaped base (273a) with a T-shaped cutout (273b) for coupling to a corresponding member (273c), from which an obliquely projecting flexible flap (273d) develops.

The upper bed profile (215) is made of aluminum and comprises a rotated U-shaped portion (215a) for receiving the upper edge of the glass panel (400). From the upper wall (215b), a narrow extension (215c) develops for fixing the rollers (300), and where rails (215d) are provided for mounting the support (111) with the filter set (110C), (110C'), (110C") that composes the filtration system (110). At the free ends of the upper profile (215), covers (217) are coupled, which allow the finishing and locking of the support (111) with the filter set (110C), (110C'), (110C").

The lower profile (216) is made of aluminum and has a U-shaped section. From the flat face of the base (216a), an orthogonal wall (216b) develops, configuring a channel for mounting the finishing profile (213) and the fixed glass panel (401), and rails for sliding the lower bed profile (220) mounted on the lower edge of the sliding glass panel (400). The lower profile (216) has drains for draining water and grooves (216c) on the lower face of the base (216a) to accommodate silicone adhesive and make it invisible, providing an exclusive finishing free of mold and mildew. At the extreme portions of the lower profile (216), lower templates (219) are coupled for sealing, protecting, and finishing the ends against the wall (p2).

The lower bed profile (220) has a rotated U-shaped section, with the side walls (220b) featuring a pair of rails (220A) on the inner faces for mounting the filters (110) and subsequent air inflow (F1). From the upper wall (220c) of the profile (220), extreme projections (220d) are developed with slight tapering and internal tines for locking the lower edge of the sliding glass panel (400). The extreme portions of the lower bed profile (220) receive covers (218) for locking the filters (110) and finishing.

It should be understood that the preferred embodiments mentioned here are merely illustrative of the present invention. Numerous variations in design and use of the present invention may be contemplated in view of the following claims without straying from the intended scope and field of the invention herein disclosed.

Having thus described the invention, what is claimed as new and secured by Letters Patent is:

1. An air filtration system for preventing escape of steam and heat from a wet internal area of a sealed or partially sealed environment to a dry external area, comprising:
   two filter sets that are arranged in a coplanar manner, each of the two filter sets are installed in one or more supports and includes one or more filters,
   wherein each of the one or more filters is provided with a central silicone membrane and bristles made of engineering plastic;
   a lower bed profile for air inflow; an upper bed profile for air outflow with the steam or the heat and for receiving a sliding glass panel;
   a top profile;
   wherein the one or more supports of one of the two filter sets are mounted on the lower bed profile via rails of the lower bed profile;
   wherein, the one or more supports of another one of the two filter sets is mounted on the upper bed profile between protrusions of the top profile and in rails of the upper bed profile.

2. The air filtration system of claim 1, wherein the filter set mounted on the upper bed profile condenses the steam on the bristles to form water that cools and wets the bristles, the now cool and wet bristles further increase condensation of the steam.

3. The air filtration system of claim 1, wherein each of the two filter sets comprise a single support and one of:
   a) three filters,
   b) two filters and
   c) one filter; and
   wherein the single support and the one or more filters form a rectangular profile with a rotated T-shaped projection attached at one end of the rectangular profile.

4. The air filtration system of claim 1, wherein the air filtration system is installed between floor and ceiling of the sealed or partially sealed environment, and wherein the air filtration system further comprises:
   a bottom profile made of aluminum;
   a top profile cover made of aluminum;
   an inverted U-shaped ceiling profile made of aluminum;
   two top profile templates made of aluminum;
   two finishing profiles made of aluminum;
   two upper bed profile covers made of aluminum;
   two lower bed profile covers made of aluminum;
   two bottom profile templates made of aluminum;
   two side finishing profiles made of aluminum;
   a fixed glass panel, and two sealing profiles, each of the two sealing profiles installed on one of the sliding glass panels and the fixed glass panel.

5. The air filtration system of claim 4, wherein the top profile is characterized by having a rotated "L" shape with an orthogonal wall and a top wall, wherein the orthogonal wall has an inverted "U" end with an arched recess for receiving rollers, the protrusions of the top profile located on an external face of a side wall of the inverted "U" end, wherein the top wall has a reversed "T" branch with a longitudinal recess for coupling a longitudinal appendix of the top profile cover;

wherein two end portions of the top profile each receive one of the two top profile templates, each of the two top profile templates configured as a rectangular frame with an upper cutout positioned near central region of the rectangular frame and a lower cutout on lower edge of the rectangular frame.

6. The air filtration system of claim 4, wherein the U-shaped ceiling profile has chamfers for concealing silicone adhesive on edges of upper wall of the inverted U-shaped ceiling profile, the chamfers installed telescopically in relation to the top profile.

7. The air filtration system of claim 4, wherein the two finishing profiles each are formed by a longitudinal plate having two orthogonal walls, the orthogonal walls of the longitudinal plate have tines.

8. The air filtration system of claim 4, wherein the sliding glass panel and the fixed glass panel are made of 12 mm (½ inch) laminated glass.

9. The air filtration system of claim 4, wherein each of the two side finishing profiles has a base with grooves for concealing silicone adhesive.

10. The air filtration system of claim 4, wherein each of the two sealing profiles is made of polyvinyl chloride and silicone and is configured as one of:

a) a T-shaped sealing comprising a U-shaped base with a T-shaped cutout for coupling to a corresponding member having a flexible elongated flap;

b) a bumper sealing formed by a U-shaped base with a T-shaped cutout for coupling to a corresponding member having a semicircular projection, and c) a squeegee sealing comprising a U-shaped base with a T-shaped cutout for coupling to a corresponding member from having a flexible flap that projects obliquely.

11. The air filtration system of claim 5, wherein the upper bed profile further comprises an inverted "U" portion to receive upper edge of the sliding glass panel, from which upper wall of the inverted "U" portion has a narrow extension for fixing the rollers and is where the rails are provided, and wherein the two upper bed profile covers are coupled to ends of the upper bed profile.

12. The air filtration system of claim 4, wherein the bottom profile has an inverted U-shape, drains for draining water, grooves for concealing silicone adhesive, and a wall attached perpendicularly to base of the bottom profile to form two channels, wherein one of the two channels is configured for mounting one of the two finishing profiles and the fixed glass panel, and wherein another of the two channels is configured for mounting the rails of the lower bed profile for sliding the lower bed profile mounted on lower edge of the sliding glass panel.

13. The air filtration system of claim 4, wherein the lower bed profile has an inverted "U" section with side walls and an upper wall, wherein the side walls of the lower bed profile have the rails of the lower bed profile on inner faces of the side walls, wherein the upper wall of the lower bed profile has projections with slight tapering and internal tines for locking lower edge of the sliding glass panel, and wherein ends of the lower bed profile receive the two lower bed profile covers.

14. The air filtration system of claim 4, wherein the lower bed profile accommodates the one or more filters and one of the two sealing profiles through the two lower bed profile covers.

15. The air filtration system, of claim 4, wherein the upper bed profile accommodates the one or more filters and one of the two sealing profiles through the two upper bed profile covers.

* * * * *